(12) United States Patent
Zeng

(10) Patent No.: US 10,656,974 B2
(45) Date of Patent: May 19, 2020

(54) METHOD FOR COMMUNICATION IN OPERATING SYSTEM AND RELATED PRODUCTS

(71) Applicant: Guangdong Oppo Mobile Telecommunications Corp., Ltd., Dongguan, Guangdong (CN)

(72) Inventor: Yuanqing Zeng, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/173,577

(22) Filed: Oct. 29, 2018

(65) Prior Publication Data

US 2019/0065285 A1 Feb. 28, 2019

Related U.S. Application Data

(63) Continuation-in-part of application No. PCT/CN2017/086450, filed on May 27, 2017.

(30) Foreign Application Priority Data

May 31, 2016 (CN) .......................... 2016 1 0380683

(51) Int. Cl.
| | |
|---|---|
| *G06F 3/00* | (2006.01) |
| *G06F 9/44* | (2018.01) |
| *G06F 9/46* | (2006.01) |
| *G06F 13/00* | (2006.01) |
| *G06F 9/54* | (2006.01) |
| *G06F 16/31* | (2019.01) |

(Continued)

(52) U.S. Cl.
CPC ............ *G06F 9/54* (2013.01); *G06F 9/30018* (2013.01); *G06F 9/48* (2013.01); *G06F 9/545* (2013.01);

(Continued)

(58) Field of Classification Search
CPC ........................................................ G06F 9/54

(Continued)

(56) References Cited

U.S. PATENT DOCUMENTS

| 8,271,996 B1 | 9/2012 | Gould et al. |
| 9,044,855 B2 | 6/2015 | Kudo |

(Continued)

FOREIGN PATENT DOCUMENTS

| CN | 102831081 A | 12/2012 |
| CN | 103632107 A | 3/2014 |

(Continued)

OTHER PUBLICATIONS

International search report issued in corresponding international application No. PCT/CN2017/086450 dated Aug. 24, 2017.

(Continued)

*Primary Examiner* — Timothy A Mudrick
(74) *Attorney, Agent, or Firm* — Young Basile Hanlon & MacFarlane, P.C.

(57) ABSTRACT

A method for communication in an operating system and related products are provided. The method may include the follows. An application layer of a terminal device obtains a feature sequence via applying a hash algorithm to a character string. The application layer of the terminal device transmits the feature sequence to a kernel of an operating system of the terminal device. The kernel of the operating system of the terminal device determines an operation specified by the character string according to the feature sequence and a correspondence relationship between feature sequences and operations specified by character strings.

20 Claims, 5 Drawing Sheets

(51) Int. Cl.
  *G06F 9/30*   (2018.01)
  *G06F 9/48*   (2006.01)
  *H04L 9/06*   (2006.01)

(52) U.S. Cl.
  CPC .......... *G06F 16/325* (2019.01); *H04L 9/0643* (2013.01)

(58) Field of Classification Search
  USPC ......................................................... 719/313
  See application file for complete search history.

(56) References Cited

U.S. PATENT DOCUMENTS

| | | |
|---|---|---|
| 2008/0046725 A1 | 2/2008 | Lo |
| 2012/0328093 A1 | 12/2012 | Kudo |
| 2016/0026514 A1 | 1/2016 | Cucinotta et al. |
| 2017/0286006 A1 | 10/2017 | Jain et al. |
| 2017/0351555 A1 | 12/2017 | Coffin |

FOREIGN PATENT DOCUMENTS

| | | | |
|---|---|---|---|
| CN | 104077522 A | 10/2014 | |
| CN | 105447397 A | 3/2016 | |

OTHER PUBLICATIONS

Extended European search report issued in corresponding European application No. 17805800.4 dated Apr. 17, 2019.

Kuhrer Marc et al, CloudSylla: Detecting Suspicious System Calls in the Cloud, Sep. 28, 2014, pp. 64-49.

METHOD FOR COMMUNICATION IN OPERATING SYSTEM AND RELATED PRODUCTS

CROSS-REFERENCE TO RELATED APPLICATION(S)

This application is a continuation-in-part of PCT Patent Application No. PCT/CN2017/086450, filed on May 27, 2017, which claims priority to Chinese Patent Application No. 201610380683.7, filed on May 31, 2016, the contents of both of which are hereby incorporated by reference in their entireties.

TECHNICAL FIELD

This disclosure relates to the technical field of communications, and particularly to a method for communication in an operating system and related products.

BACKGROUND

With increased development of operating system theory, a system architecture of an operating system is constantly optimized, so as to play an important role in improving a utilization of resources of terminal devices and improving overall performance of the terminal devices. In the operating system theory, the system architecture may be typically a system architecture having an underlying hardware layer, a kernel of the operating system, and a top application layer. The kernel of the operating system is used as a bridge for communication between hardware and applications.

In the operating system, an interaction between the application layer and the kernel of the operating system can be performed in various manners, such as sysfs, procfs, system call and the like. Data transmission for an interaction is typically performed in plaintext form.

When a third-party monitoring application monitors data for an interaction between the kernel of the operating system and the application layer, leakage of user information may arise, thus safety cannot be ensured.

SUMMARY

In a first aspect, implementations of the present disclosure provide a method for communication in an operating system. The method includes the follows. An application layer of a terminal device obtains a feature sequence via applying a hash algorithm to a character string. The application layer of the terminal device transmits the feature sequence to a kernel of an operating system of the terminal device. The kernel of the operating system of the terminal device determines an operation specified by the character string at least according to the feature sequence and a correspondence relationship between feature sequences and operations specified by character strings.

In a second aspect, the implementations of the present disclosure provide a terminal device. The terminal device includes at least one processor and a computer readable memory coupled to the at least one processor and storing at least one computer executable instruction therein which, when executed by the at least one processor, causes the at least one processor to carry out actions. The actions may include the follows. An application layer of the terminal device is enabled to obtain a feature sequence via applying a hash algorithm to a character string. The application layer of the terminal device is enabled to transmit the feature sequence to a kernel of an operating system of the terminal device. The kernel of the operating system of the terminal device is enabled to determine an operation specified by the character string at least according to the feature sequence and a correspondence relationship between feature sequences and operations specified by character strings.

In a third aspect, the implementations of the present disclosure provide a terminal device. The terminal device includes at least one processor and a computer readable memory coupled to the at least one processor and storing at least one computer executable instruction therein which, when executed by the at least one processor, causes the at least one processor to carry out actions. The actions may include the follows. An application layer of the terminal device is enabled to obtain a first hash sequence via applying a hash algorithm to a character string. The application layer of the terminal device is enabled to obtain a second hash sequence via applying the hash algorithm to the first hash sequence and set the second hash sequence to be a feature sequence. The application layer of the terminal device is enabled to transmit the feature sequence to a kernel of an operating system of the terminal device. The kernel of the operating system is enabled to determine whether the feature sequence corresponds to more than one operation according to the feature sequence and a correspondence relationship between feature sequences and operations specified by character strings. The kernel of the operating system is enabled to determine an operation specified by the character string according to the feature sequence and the correspondence relationship between feature sequences and operations specified by character strings, based on a determination that the feature sequence corresponds to one operation.

BRIEF DESCRIPTION OF THE DRAWINGS

To describe technical solutions in the implementations of the present disclosure more clearly, the following briefly introduces the accompanying drawings required for describing the implementations.

DETAILED DESCRIPTION

Figure 1:
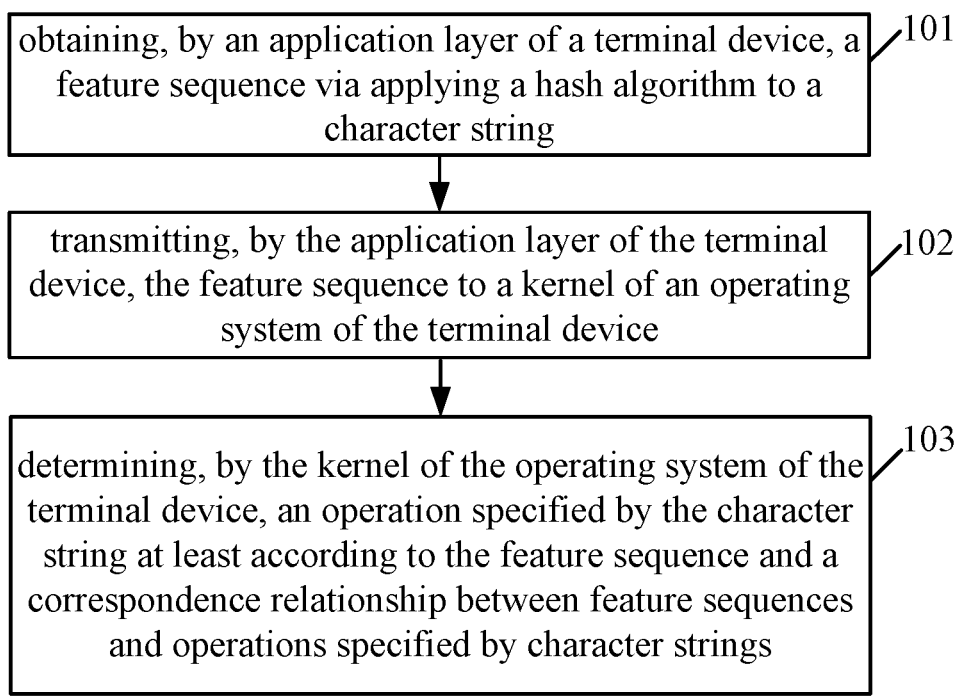
FIG. 1 is a schematic flow chart illustrating a method for communication in an operating system according to an implementation of the present disclosure.

In order to illustrate purposes, technical solutions, and advantages of the present disclosure more clearly, in the following the present disclosure will be further described specifically with reference to the accompanying drawings. Apparently, the described implementations are merely some rather than all implementations of the present disclosure. All other implementations obtained by those ordinarily skilled in the art based on the implementations of the present disclosure without creative efforts shall fall within the protection scope of the present disclosure.

Implementations of the present disclosure provide a method for communication in an operating system and related devices, so as to avoid leakage of user information due to that an interaction between an application layer and a kernel of the operating system is monitored by a third-party application, reduce the complexity of operations in a communication process, and save time. The following will specifically describe the method and the device, respectively.

According to the implementations of the present disclosure, a method for communication in an operating system is provided. The method includes the follows. An application layer of a terminal device obtains a feature sequence via applying a hash algorithm to a character string. The application layer of the terminal device transmits the feature sequence to a kernel of an operating system of the terminal device. The kernel of the operating system of the terminal device determines an operation specified by the character string at least according to the feature sequence and a correspondence relationship between feature sequences and operations specified by character strings.

In at least one implementation, the obtaining, by an application layer of a terminal device, a feature sequence via applying a hash algorithm to a character string may include the follows. The application layer of the terminal device obtains a first hash sequence via applying the hash algorithm to the character string, obtains a second hash sequence via applying the hash algorithm to the first hash sequence, and sets the second hash sequence to be the feature sequence.

In at least one implementation, the correspondence relationship is recorded in a configuration table, the configuration table is a configuration table established with feature sequences transmitted to the kernel of the operating system of the terminal device as indexes.

In at least one implementation, the determining, by the kernel of the operating system of the terminal device, an operation specified by the character string at least according to the feature sequence and a correspondence relationship between feature sequences and operations specified by character strings may include the follows. The kernel of the operating system of the terminal device determines whether the feature sequence corresponds to more than one operation by traversing the configuration table according to the feature sequence, requests from the application layer of the terminal device the first hash sequence based on a determination that the feature sequence corresponds to more than one operation, receives from the application layer of the terminal device the first hash sequence, and determines the operation specified by the character string according to the first hash sequence and a one-to-one relationship between hash sequences and operations specified by character strings.

In at least one implementation, the method may further include the follows. The kernel of the operating system of the terminal device determines from the configuration table the operation specified by the character string based on a determination that the feature sequence corresponds to one operation.

In at least one implementation, the obtaining, by the application layer of the terminal device, a first hash sequence via applying the hash algorithm to the character string may include the follows. The application layer of the terminal device obtains the first hash sequence of a 64-bit length via applying the hash algorithm to the character string. The obtaining, by the application layer of the terminal device, a second hash sequence via applying the hash algorithm to the first hash sequence may include the follows. The application layer of the terminal device obtains the second hash sequence of a 10-bit length or an 11-bit length via applying the hash algorithm to the first hash sequence.

In at least one implementation, the transmitting, by the application layer of the terminal device, the feature sequence to a kernel of an operating system of the terminal device may include the follows. The application layer of the terminal device transmits the feature sequence to the kernel of the operating system of the terminal device in plaintext form.

According to the implementations of the present disclosure, a terminal device is provided. The terminal device includes at least one processor and a computer readable memory coupled to the at least one processor and storing at least one computer executable instruction therein which, when executed by the at least one processor, causes the at least one processor to carry out actions. The actions may include the follows. An application layer of the terminal device is enabled to obtain a feature sequence via applying a hash algorithm to a character string. The application layer of the terminal device is enabled to transmit the feature sequence to a kernel of an operating system of the terminal device. The kernel of the operating system of the terminal device is enabled to determine an operation specified by the character string at least according to the feature sequence and a correspondence relationship between feature sequences and operations specified by character strings.

According to the implementations of the present disclosure, another terminal device is provided. The terminal device includes at least one processor and a computer readable memory coupled to the at least one processor and storing at least one computer executable instruction therein which, when executed by the at least one processor, causes the at least one processor to carry out actions. The actions may include the follows. An application layer of the terminal device is enabled to obtain a first hash sequence via applying a hash algorithm to a character string. The application layer of the terminal device is enabled to obtain a second hash sequence via applying the hash algorithm to the first hash sequence and set the second hash sequence to be a feature sequence. The application layer of the terminal device is enabled to transmit the feature sequence to a kernel of an operating system of the terminal device. The kernel of the operating system is enabled to determine whether the feature sequence corresponds to more than one operation according to the feature sequence and a correspondence relationship between feature sequences and operations specified by character strings. The kernel of the operating system is enabled to determine an operation specified by the character string according to the feature sequence and the correspondence relationship between feature sequences and operations specified by character strings, based on a determination that the feature sequence corresponds to one operation.

Referring to FIG. 1, FIG. 1 is a schematic flow chart illustrating a method for communication in an operating system according to an implementation of the present disclosure. As illustrated in FIG. 1, the method begins at block 101.

At block 101, an application layer of a terminal device obtains a feature sequence via applying a hash algorithm to a character string.

In the implementation of the present disclosure, the terminal device may be any terminal device having a data storage function, such as a smart phone, a digital camera, a smart wearable device, a personal digital assistant (PDA), a point of sales (POS), and so on, which will not be repeated hereinafter in the implementation of the present disclosure.

An interaction between the kernel of the operating system and the application layer is mainly performed in plaintext form, that is, when the application layer transmits a character string to the kernel of the operating system, the kernel of the operating system determines a specified resource or performs a corresponding operation according to the character string. The hash algorithm can be used to convert a set of binary values of any length into a set of binary values of a short and fixed length. Even if just one character of the character string needed to be transmitted is changed, a different hash sequence is generated after applying the hash algorithm to the changed character string. Therefore, a hash sequence can be used to represent a character string for an interaction.

In the implementation of the present disclosure, the application layer of the terminal device applies the hash algorithm to the character string needed to be transmitted to the kernel of the operating system, and sets the obtained hash sequence as the feature sequence. In the following steps, transmitting the feature sequence is used to replace transmitting the character string in plaintext form. Common hash algorithms may include the message-digest algorithm 5 (MD5), the secure hash algorithm 1 (SHA-1), and so on. The hash algorithms have a good compression performance, a good anti-collision performance, and a good anti-modification performance, and furthermore, computation is simple.

Since the hash algorithm is irreversible, that is, according to the hash sequence, the character string before computation cannot be obtained. Therefore, even if a third-party application obtains the feature sequence transmitted between the kernel of the operating system and the application layer, the third-party application cannot obtain information content for an actual interaction, thereby protecting user information.

In an alternative implementation, the character string needed to be transmitted is converted into a set of binary values, and then the hash algorithm is applied to the set of binary values to obtain the hash sequence of a 64-bit length, and the hash sequence is set to be the feature sequence.

At block 102, the application layer of the terminal device transmits the feature sequence to the kernel of the operating system of the terminal device.

In the implementation of the present disclosure, the application layer of the terminal device obtains the feature sequence via applying the hash algorithm to the character string needed to be transmitted, and then transmits the feature sequence to the kernel of the operating system. Since the hash algorithm can be used to convert a set of binary values of any length into a set of binary values of a short and fixed length, comparing the feature sequence with the character string needed to be transmitted, the length of the feature sequence is short and fixed, which can save system memory, and facilitate in improving running efficiency of the system.

At block 103, the kernel of the operating system of the terminal device determines an operation specified by the character string at least according to the feature sequence and a correspondence relationship between feature sequences and operations specified by character strings.

In the implementation of the present disclosure, an operation specified by one character string may include finding a resource such as a file corresponding to the feature sequence, performing a modification operation on a certain file, or the like. Under some conditions, the operation specified by one character string may be a combination of two or more actions such as a combination of finding a file and modifying the file, and the present disclosure is not limited thereto.

In the implementation of the present disclosure, the correspondence relationship is recorded in a configuration table. The configuration table is a configuration table established with feature sequences transmitted to the kernel of the operating system as indexes.

In an alternative implementation, the kernel of the operating system of the terminal device traverses the configuration table to determine an item with the feature sequence as the index, and executes an operation corresponding to the item.

In the method illustrated in FIG. 1, data transmitted between the application layer of the terminal device and the kernel of the operating system is the hash sequence. Since the hash sequence is irreversible, steal of user information due to that data for an interaction between the application layer and the kernel of the operating system is monitored by a third-party application can be avoided.

Figure 2:
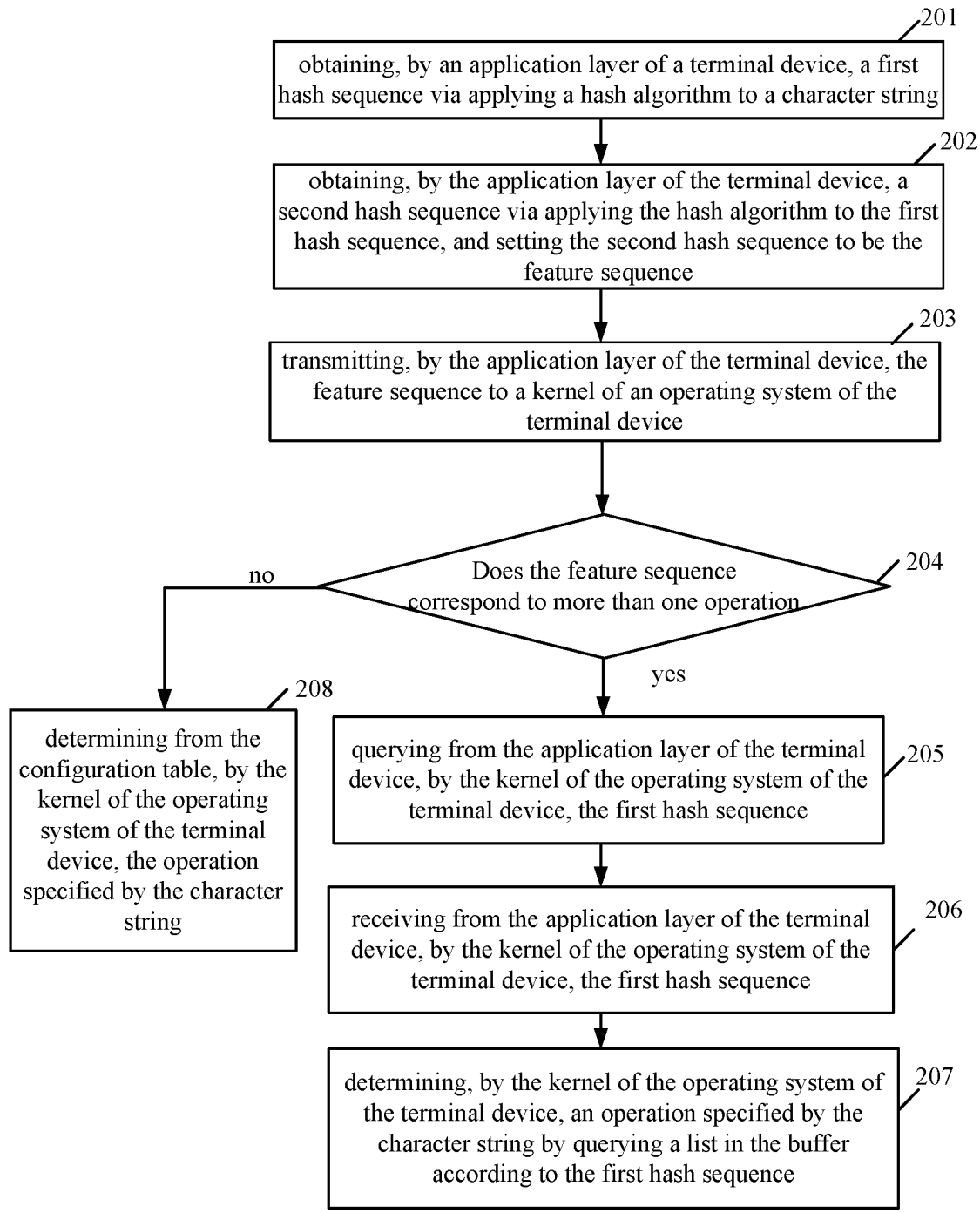
FIG. 2 is a schematic flow chart illustrating another method for communication in the operating system according to an implementation of the present disclosure.

Referring to FIG. 2, FIG. 2 is a schematic flow chart illustrating another method for communication in an operating system according to an implementation of the present disclosure. As illustrated in FIG. 2, the method begins at block 201.

At block 201, an application layer of a terminal device obtains a first hash sequence via applying a hash algorithm to a character string.

In the implementation of the present disclosure, the application layer of the terminal device applies the hash algorithm to the character string needed to be transmitted to the kernel of the operating system. In the follows, transmitting the feature sequence obtained by computation is used to replace transmitting the character string in plaintext form. Common hash algorithms may include the MD5, the SHA-1, and so on. The hash algorithms have a good compression performance, an anti-collision performance, and an anti-modification performance, and furthermore, computation is simple.

Since the hash algorithm is irreversible, that is, according to the hash sequence, the character string before computation cannot be obtained. Therefore, even if a third-party application obtains the feature sequence transmitted between the kernel of the operating system and the application layer, the third-party application cannot obtain information content for an actual interaction, thereby protecting user information.

In an alternative implementation, the character string needed to be transmitted is converted into a set of binary values, and then the hash algorithm is applied to the set of binary values to obtain a hash sequence of a 64-bit length.

At block 202, the application layer of the terminal device obtains a second hash sequence via applying the hash algorithm to the first hash sequence, and set the second hash sequence to be the feature sequence.

In the implementation of the present disclosure, the original character string is converted into a set of binary values, the first hash sequence obtained by applying the hash algorithm to the character string has a fixed length, and the common length is a 64-bit length or a 128-bit length. Compared with the original data length, a certain compression is generated. However, a further compression may be needed to reduce the search range. Therefore, it needs to apply the hash algorithm to the first hash sequence to obtain a second hash sequence of a short length, and the second hash sequence is set to be the feature sequence.

In an alternative implementation, the application layer of the terminal device applies the hash algorithm to the first hash sequence of the 64-bit length to obtain the second hash sequence, and sets the second hash sequence to be the feature sequence. The feature sequence has a 10-bit length or an 11-bit length, that is, the search range is decreased from 2^64 to 2^10 or 2^11, thereby improving search efficiency.

At block 203, the application layer of the terminal device transmits the feature sequence to the kernel of the operating system of the terminal device.

In the implementation of the present disclosure, the application layer of the terminal device obtains the feature sequence via applying the hash algorithm to the character string needed to be transmitted twice, and then transmits the feature sequence to the kernel of the operating system. Since the hash algorithm can be used to convert a set of binary values of any length into a set of binary values of a short and fixed length, comparing the feature sequence with the character string needed to be transmitted, the length of the feature sequence is short and fixed, which can save system memory, and facilitate in improving running efficiency of the system.

At block 204, the kernel of the operating system of the terminal device determines whether the feature sequence corresponds to more than one operation by traversing a configuration table according to the feature sequence. When yes, operations at blocks 205 to 207 are performed, otherwise, an operation at block 208 is performed.

In the implementation of the present disclosure, the configuration table is a configuration table established with feature sequences transmitted to the kernel of the operating system of the terminal device as indexes. The configuration table contains a correspondence relationship between feature sequences and operations specified by character strings. In the process of applying the hash algorithm to different first hash sequences, identical second hash sequences may be obtained, that is to say, identical feature sequences may be obtained. Therefore, in order to accurately determine an operation corresponding to the character string when the feature sequence corresponding to the character string is the same as one or more feature sequences corresponding to one or more other character strings, a list in a buffer is used. The list in the buffer contains a one-to-one relationship between hash sequences and operations specified by character strings. That is to say, in the one-to-one relationship, one hash sequence just corresponds to one operation. According to the first hash sequence corresponding to the character string and the one-to-one relationship, the operation specified by the character string can be determined.

At block 205, the kernel of the operating system of the terminal device queries from the application layer of the terminal device the first hash sequence.

At block 206, the kernel of the operating system of the terminal device receives from the application layer of the terminal device the first hash sequence.

At block 207, the kernel of the operating system of the terminal device determines the operation specified by the character string by querying the list in the buffer according to the first hash sequence.

In the implementation of the present disclosure, if the feature sequence corresponds to more than one operation, the unique operation specified by the character string cannot be determined according to the feature sequence, that is, the operation specified by the original character string cannot be determined. Therefore, it needs to receive from the application layer of the terminal device the first hash sequence, and the operation specified by the character string is determined according to the first hash sequence and the one-to-one correspondence relationship between hash sequences and operations specified by character strings.

At block 208, the kernel of the operating system of the terminal device determines from the configuration table the operation specified by the character string.

In the implementation of the present disclosure, if the feature sequence just corresponds to one operation, the unique operation specified by the original character string can be determined in the configuration table according to the feature sequence.

In the method illustrated in FIG. 2, a second hash sequence of a short length is obtained via applying the hash algorithm to the original character string twice, and the second hash sequence is set to be the feature sequence. When the kernel of the operating system of the terminal device queries the operation specified by the character string according to the feature sequence, since the length of the feature sequence is short, the search range is small, and computation resources and computation time of the system are saved.

Figure 3:
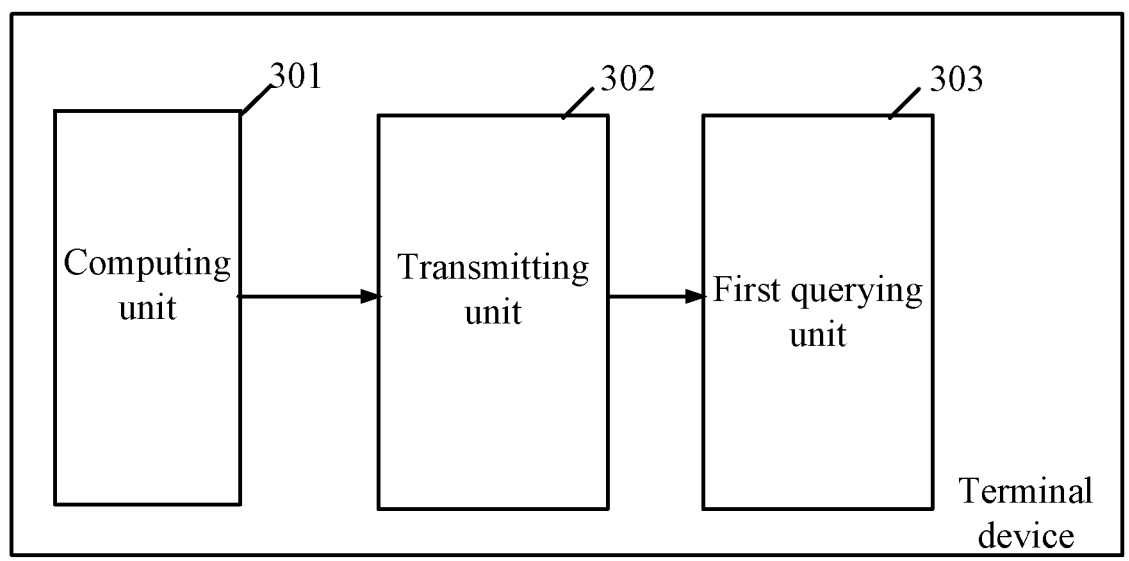
FIG. 3 is a schematic structural diagram illustrating a communication device in the operating system according to an implementation of the present disclosure.

Referring to FIG. 3, FIG. 3 is a schematic structural diagram illustrating a communication device in an operating system according to an implementation of the present disclosure. As illustrated in FIG. 3, the device includes a computing unit 301, a transmitting unit 302, and a first querying unit 303.

The computing unit 301 is configured to obtain a feature sequence via applying a hash algorithm to a character string.

An interaction between the kernel of the operating system and the application layer is mainly performed in plaintext form, that is, when the application layer transmits a character string to the kernel of the operating system, the kernel of the operating system determines a specified resource or performs a corresponding operation according to the character string. The hash algorithm can be used to convert a set of binary values of any length into a set of binary values of a short and fixed length. Even if just one character of the character string needed to be transmitted is changed, a different hash sequence is generated after applying the hash algorithm to the changed character string. Therefore, a hash sequence can be used to represent a character string for an interaction.

In the implementation of the present disclosure, the computing unit 301 applies the hash algorithm to the character string needed to be transmitted to the kernel of the operating system, and sets the obtained hash sequence as the feature sequence. In the follows, transmitting the feature sequence is used to replace transmitting the character string in plaintext form. Common hash algorithms may include the MD5, the SHA-1, and so on. The hash algorithms have a good compression performance, an anti-collision performance, and an anti-modification performance, and furthermore, computation is simple.

Since the hash algorithm is irreversible, that is, according to the hash sequence, the character string before computation cannot be obtained. Therefore, even if a third-party application obtains the feature sequence transmitted between the kernel of the operating system and the application layer, the third-party application cannot obtain information content for an actual interaction, thereby protecting user information.

In an alternative implementation, the computing unit 301 converts the character string needed to be transmitted into a set of binary values, and then applies the hash algorithm to the set of binary values to obtain the hash sequence of a 64-bit length, and sets the hash sequence to be the feature sequence.

The transmitting unit 302 is configured to transmit the feature sequence to the kernel of the operating system of the terminal device.

In the implementation of the present disclosure, the computing unit 301 obtains the feature sequence via applying the hash algorithm to the character string needed to be transmitted, and then the transmitting unit 302 transmits the feature sequence to the kernel of the operating system. Since the hash algorithm can be used to convert a set of binary values of any length into a set of binary values of a short and fixed length, comparing the feature sequence with the character string needed to be transmitted, the length of the feature sequence is short and fixed, which can save system memory, and facilitate in improving running efficiency of the system.

The first querying unit 303 may be configured to determine an operation specified by the character string at least according to the feature sequence and a correspondence relationship between feature sequences and operations specified by character strings.

In the implementation of the present disclosure, the correspondence relationship between feature sequences and operations specified by character strings is contained in a configuration table. The configuration table is a configuration table established with feature sequences transmitted to the kernel of the operating system of the terminal device as indexes.

In an alternative implementation, the first querying unit 303 traverses the configuration table to determine an item with the feature sequence as the index, and executes an operation corresponding to the item.

In the device illustrated in FIG. 3, data transmitted between the application layer of the terminal device and the kernel of the operating system is the hash sequence. Since the hash sequence is irreversible, steal of user information due to that data for an interaction between the application layer and the kernel of the operating system is monitored by a third-party application can be avoided.

Figure 4:
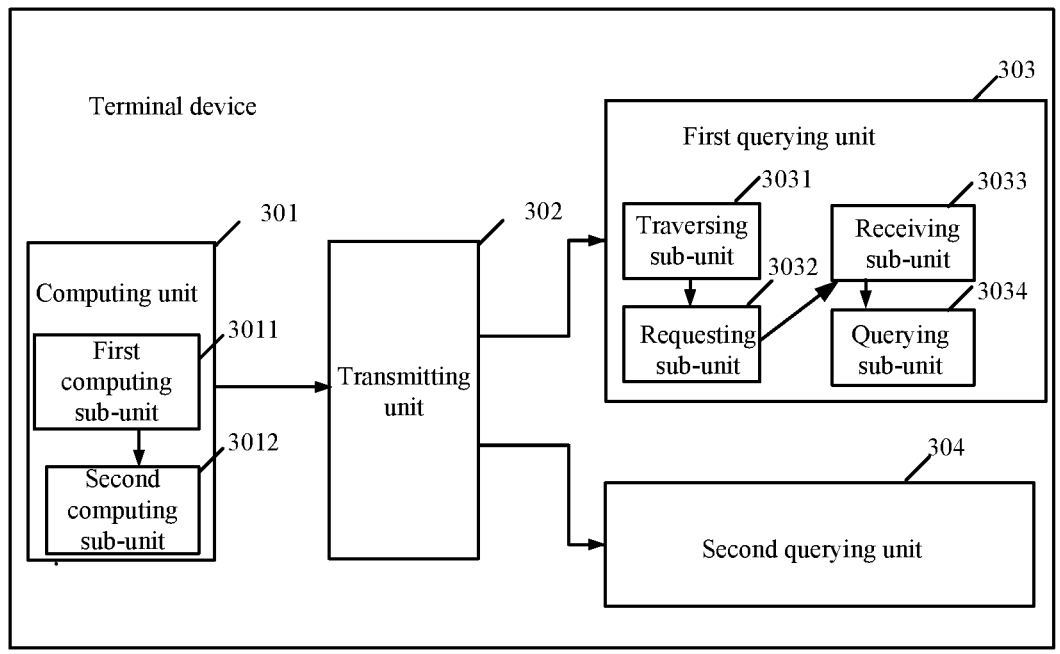
FIG. 4 is a schematic structural diagram illustrating another communication device in the operating system according to an implementation of the present disclosure.

Referring to FIG. 4, FIG. 4 is a schematic structural diagram illustrating another communication device in an operating system according to an implementation of the present disclosure. The device illustrated in FIG. 4 is obtained by optimizing the device illustrated in FIG. 3. Compared with the device illustrated in FIG. 3, in the device illustrated in FIG. 4, the computing unit 301 may include a first computing sub-unit 3011 and a second computing sub-unit 3012.

The first computing sub-unit 3011 is configured to obtain a first hash sequence via applying a hash algorithm to a character string.

In an alternative implementation, the first computing sub-unit 3011 converts the character string needed to be transmitted into a set of binary values, and then applies the hash algorithm to the set of binary values to obtain the first hash sequence of a 64-bit length.

The second computing sub-unit 3012 may be configured to obtain a second hash sequence via applying the hash algorithm to the first hash sequence, and set the second hash sequence to be the feature sequence.

In the implementation of the present disclosure, the original character string is converted into a set of binary values, the hash sequence obtained by applying the hash algorithm to the character string has a fixed length, and the common length is a 64-bit length or a 128-bit length. Compared with the original data length, a certain compression is generated. However, a further compression may be needed to decrease the search range. Therefore, it needs to apply the hash algorithm to the first hash sequence to obtain a second hash sequence of a short length, and the second hash sequence is set to be the feature sequence.

In an alternative implementation, the second computing sub-unit 3012 applies the hash algorithm to the first hash sequence of the 64-bit length obtained by the first computing sub-unit 3011 to obtain the second hash sequence, and sets the second hash sequence to be the feature sequence. The feature sequence has a 10-bit length or an 11-bit length, that is, the search range is decreased from 2^64 to 2^10 or 2^11, thereby improving search efficiency.

In an alternative implementation, as illustrated in FIG. 4, the first querying unit 303 may include a traversing sub-unit 3031, a requesting sub-unit 3032, a receiving sub-unit 303, and a querying sub-unit 3034.

The first querying unit 303 may be configured to determine whether the feature sequence corresponds to one operation by traversing the configuration table according to the feature sequence.

In the implementation of the present disclosure, the configuration table is a configuration table established with feature sequences transmitted to the kernel of the operating system of the terminal device as indexes. The configuration table contains a correspondence relationship between feature sequences and operations specified by character strings. In the process of applying the hash algorithm to different first hash sequences, identical second hash sequences may be obtained, that is to say, identical feature sequences may be obtained. Therefore, in order to accurately determine an operation corresponding to the character string when the feature sequence corresponding to the character string is the same as one or more feature sequences corresponding to one or more other character strings, a list in a buffer is used. The list in the buffer contains a one-to-one relationship between hash sequences and operations specified by character strings. That is to say, in the one-to-one relationship, one hash sequence just corresponds to one operation. According to the first hash sequence corresponding to the character string and the one-to-one relationship, the operation specified by the character string can be determined.

The requesting sub-unit 3032 may be configured to query from the application layer of the terminal device the first hash sequence when the feature sequence corresponds to more than one operation.

The receiving sub-unit 303 may be configured to receive from the application layer of the terminal device the first hash sequence.

The querying sub-unit 3034 may be configured to determine the operation specified by the character string by querying the list in the buffer according to the first hash sequence. In the implementation of the present disclosure, if the feature sequence corresponds to more than one operation, the unique operation specified by the character string cannot be determined according to the feature sequence, that is, the operation specified by the original character string cannot be determined. Therefore, it needs to receive from the application layer of the terminal device the first hash sequence, and the operation specified by the character string is determined according to the first hash sequence and the one-to-one correspondence relationship between hash sequences and operations specified by character strings.

In an alternative implementation, as illustrated in FIG. 4, the device may further include a second querying unit 304 configured to determine from the configuration table the operation specified by the character string when the feature sequence just corresponds to one operation.

In the implementation of the present disclosure, if the feature sequence just corresponds to one operation, the second querying unit 304 can determine in the configuration table, according to the feature sequence, the unique operation specified by the original character string.

In the device illustrated in FIG. 4, a second hash sequence of a short length can be obtained via applying the hash algorithm to the original character string twice, and the second hash sequence is set to be the feature sequence. When the kernel of the operating system of the terminal device queries the operation specified by the character string according to the feature sequence, since the length of the feature sequence is short, the search range is small, and computation resources and computation time of the system are saved.

It shall be noted that the device illustrated in the device implementation of the present disclosure is presented in the form of functional units. "Units" used herein shall be broadly understood as much as possible. Objects for realizing functions described in various "units" may be for example, an application-specific integrated circuit (ASIC), a single circuit, processors (shared, specified, or a set of chips) for performing one or more software or hardware programs, a memory, a combinational logic circuit, and/or other appropriate components for realizing the above functions.

Figure 5:
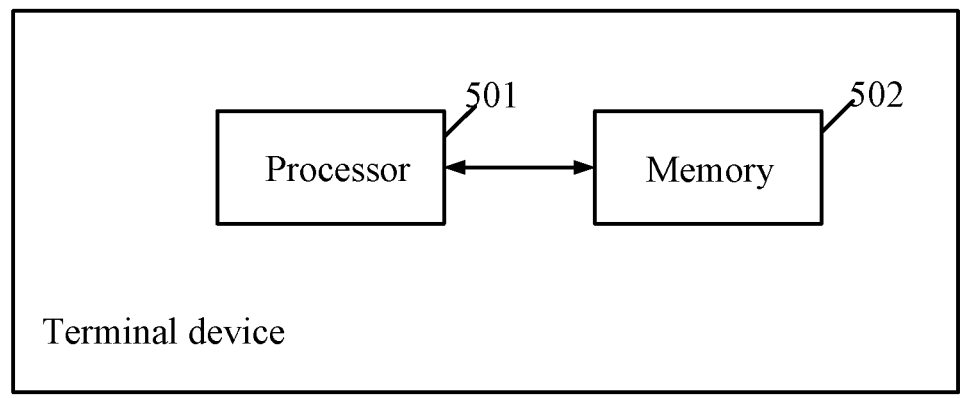
FIG. 5 is a schematic structural diagram illustrating a terminal device according to an implementation of the present disclosure.

Referring to FIG. 5, FIG. 5 is a schematic structural diagram illustrating a terminal device according to an implementation of the present disclosure. As illustrated in FIG. 5, the terminal device may include a processor 501 and a memory 502. The memory 502 may provide a buffer for the processor 501 to perform data processing, and further provide data for the processor 501 to perform data processing and data call and provide a storage space for obtained data.

In the implementation of the present disclosure, the memory 502 stores at least one executable instruction therein. When the at least one executable instruction in the memory 502 is executed by the processor 501, the processor 501 is caused to carry out actions.

In the implementation, the processor 501 is caused to enable an application layer of the terminal device to obtain a feature sequence via applying a hash algorithm to a character string, enable the application layer of the terminal device to transmit the feature sequence to a kernel of an operating system of the terminal device, and enable the kernel of the operating system of the terminal device to determine an operation specified by the character string at least according to the feature sequence and a correspondence relationship between feature sequences and operations specified by character strings.

In at least one implementation, the processor 501 caused to enable the application layer of the terminal device to obtain the feature sequence via applying the hash algorithm to the character string may be further caused to enable the application layer of the terminal device to obtain a first hash sequence via applying the hash algorithm to the character string, obtain a second hash sequence via applying the hash algorithm to the first hash sequence, and set the second hash sequence to be the feature sequence.

In at least one implementation, the correspondence relationship is recorded in a configuration table, the configuration table is a configuration table established with feature sequences transmitted to the kernel of the operating system of the terminal device as indexes.

In at least one implementation, the processor 501 caused to enable the kernel of the operating system of the terminal device to determine the operation specified by the character string is further caused to enable the kernel of the operating system of the terminal device to determine whether the feature sequence corresponds to more than one operation by traversing the configuration table according to the feature sequence, request from the application layer of the terminal device the first hash sequence based on a determination that the feature sequence corresponds to more than one operation, receive from the application layer of the terminal device the first hash sequence, and determine the operation specified by the character string according to the first hash sequence and a one-to-one relationship between hash sequences and operations specified by character strings.

In at least one implementation, the processor 501 is further caused to enable the kernel of the operating system of the terminal device to determine from the configuration table the operation specified by the character string based on a determination that the feature sequence corresponds to one operation.

In at least one implementation, the processor 501 caused to enable the application layer of the terminal device to obtain the first hash sequence via applying the hash algorithm to the character string is further caused to enable the application layer of the terminal device to obtain the first hash sequence of a 64-bit length via applying the hash algorithm to the character string. The processor caused to enable the application layer of the terminal device to obtain the second hash sequence via applying the hash algorithm to the first hash sequence is further caused to enable the application layer of the terminal device to obtain the second hash sequence of a 10-bit length or an 11-bit length via applying the hash algorithm to the first hash sequence.

In at least one implementation, the processor 501 caused to enable the application layer of the terminal device to transmit the feature sequence to a kernel of an operating system of the terminal device is further caused to enable the application layer of the terminal device to transmit the feature sequence to the kernel of the operating system of the terminal device in plaintext form.

In an alternative implementation, the processor 501 is caused to perform the follows. An application layer of the terminal device is enabled to obtain a first hash sequence via applying a hash algorithm to a character string. The application layer of the terminal device is enabled to obtain a second hash sequence via applying the hash algorithm to the first hash sequence and set the second hash sequence to be a feature sequence. The application layer of the terminal device is enabled to transmit the feature sequence to a kernel of an operating system of the terminal device. The kernel of the operating system is enabled to determine whether the feature sequence corresponds to more than one operation according to the feature sequence and a correspondence relationship between feature sequences and operations specified by character strings. The kernel of the operating system is enabled to determine an operation specified by the character string according to the feature sequence and the correspondence relationship between feature sequences and operations specified by character strings, based on a determination that the feature sequence corresponds to one operation.

In the terminal device illustrated in FIG. 5, the feature sequence transmitted to the kernel of the operating system by the application layer of the terminal device is obtained via applying the hash algorithm to the character string needed to be transmitted. Since the hash algorithm is irreversible, even if a third-party application monitors the feature sequence communicated between the application layer and the kernel of the operating system, the original character string cannot be obtained, thereby protecting user information and avoiding leakage of user information. Meanwhile, the hash algorithm is a quick algorithm and can convert a long sequence of an unfixed length into a sequence of a fixed and short length. When the kernel of the operating system searches the operation specified by the character string according to the feature sequence, the complexity of computation can be reduced and time can be saved by performing query according to the short feature sequence obtained via applying the hash algorithm.

Figure 6:
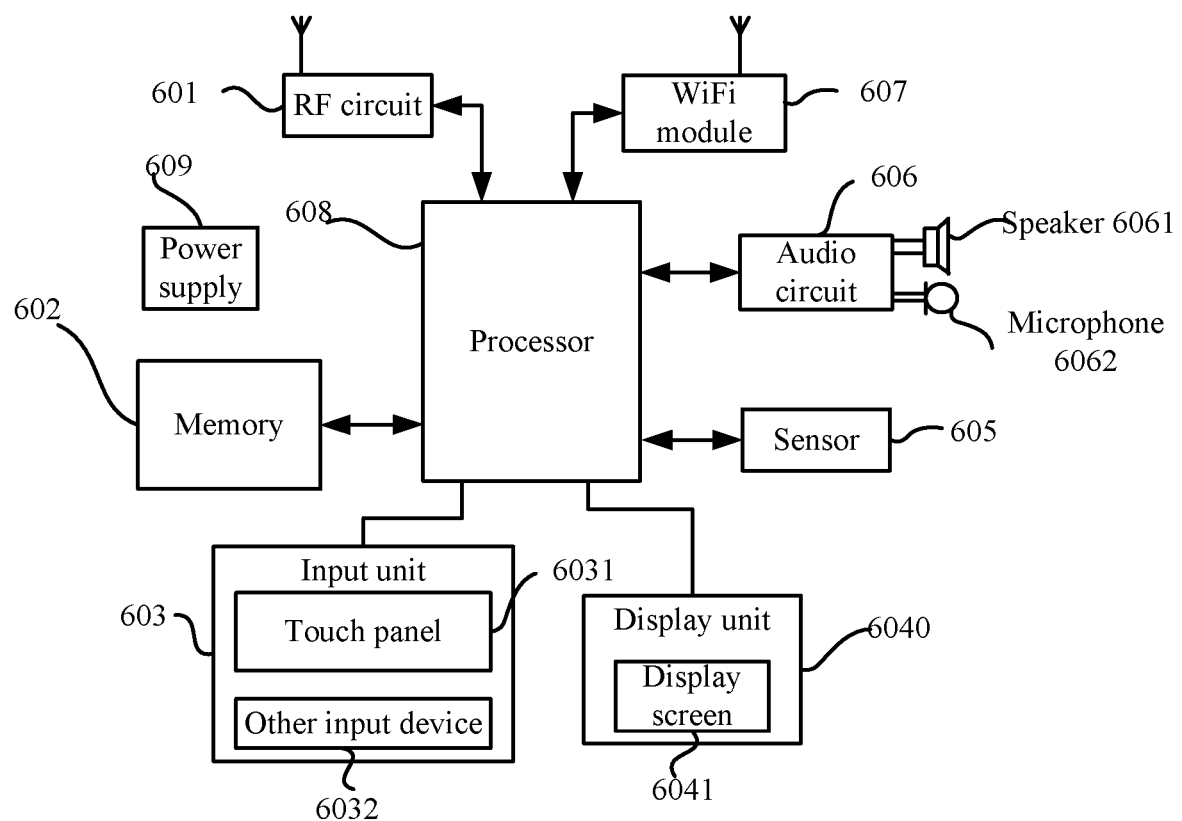
FIG. 6 is a schematic structural diagram illustrating another terminal device according to an implementation of the present disclosure.

Referring to FIG. 6, FIG. 6 is a schematic structural diagram illustrating another terminal device according to an implementation of the present disclosure. As illustrated in FIG. 6, only parts related to the implementation of the disclosure are illustrated for the convenience of description. For technical details not described, reference may be made to the method implementations of the present disclosure. The terminal device may be any terminal device, such as a mobile phone, a tablet computer, a personal digital assistant (PDA), a point of sale terminal (POS), an on-board computer, and the like. The following describes a mobile phone as an example of the terminal device.

FIG. 6 is a block diagram illustrating a part of the structure of a mobile phone related to the terminal device according to an implementation of the present disclosure. With reference to FIG. 6, the mobile phone may include a radio frequency (RF) circuit 601, a memory 602, an input unit 603, a display unit 604, a sensor 605, an audio circuit 606, a wireless fidelity (Wi-Fi) module 607, a processor 608, a power supply 609, and so on. Those skilled in the art can understand that the structure of the mobile phone illustrated in FIG. 6 does not constitute any limitation on a mobile phone. The mobile phone may include more or fewer components than illustrated, or may combine certain components or different components.

The following will specifically illustrate various components of the mobile phone in combination with FIG. 6.

The RF circuit 601 is configured to receive and transmit information or receive and transmit signals during a call, and in particular, receive downlink information from a base station and transfer the downlink information to the processor 608 for processing, and transmit uplink data to the base station. Generally, the RF circuit 601 includes but is not limited to an antenna, at least one amplifier, a transceiver, a coupler, a low noise amplifier (LNA), a duplexer and the like. In addition, the RF circuit 601 may also communicate with the network and other devices by wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 602 is configured to store software programs and modules, and the processor 608 is configured to execute various function applications and data processing of the mobile phone by running the software programs and the modules stored in the memory 602. The memory 602 mainly includes a program storage area and a data storage area. The program storage area may store an operating system, application programs required for at least one function (for example, a function of sound playing, a function of image playing, and so on) and so on. The data storage area may store data (for example, audio data, a telephone directory, and so on) created according to use of the mobile phone, and so on. In addition, the memory 602 may include a high-speed RAM, and may further include a non-volatile memory such as at least one disk storage device, a flash device, or other non-volatile solid storage devices.

The input unit 603 may be configured to receive input digital or character information and generate key signal input associated with user setting and function control of the mobile phone. The input unit 603 may include a touch panel 6031 and other input devices 6032. The touch panel 6031, also referred to as a touch screen, may receive a touch operation of the user thereon or nearby (e.g., operation on or near the touch panel 6031 by a user using a finger or stylus, or any suitable object or attachment), and drive a corresponding connection device according to a pre-set program. Optionally, the touch panel 6031 may include a touch detection device and a touch controller. The touch detection device detects the touch orientation of the user and detects a signal resulted from the touch operation, and transmits the signal to the touch controller. The touch controller receives the touch information from the touch detection device and converts the information into contact coordinates and sends the contact coordinates to the processor 608, and can receive and execute the command sent by the processor 608. In addition, the touch panel 6031 can be realized using various types such as a resistive type, a capacitive type, an infrared type, and a surface acoustic wave type. In addition to the touch panel 6031, the input unit 603 may further include the other input devices 6032. The other input devices 6032 may include, but is not limited to, one or more of a physical keyboard, function keys (such as volume control buttons, switch buttons, and so on), a trackball, a mouse, and a joystick.

The display unit 604 is configured to display information input by the user or information provided for the user or various menus of the mobile phone. The display unit 604 may include a display panel 6041, and alternatively, the display screen 941 may be in the form of a liquid crystal display (LCD), an organic light-emitting diode (OLED) and so on. Furthermore, the touch panel 6031 may cover the display panel 6041. When the touch panel 6031 detects a touch operation thereon or nearby, information of the touch operation can be transmitted to the processor 608 so as to determine the type of the touch event. The processor 608 provides corresponding visual output on the display panel 6041 according to the type of the touch event. Although in FIG. 6, the touch panel 6031 and the display panel 6041 are used as two separate components to realize the input and output functions of the mobile phone, in some implementations, the touch panel 6031 may be integrated with the display panel 6041 to implement the input and output functions of the mobile phone.

The mobile phone may also include at least one sensor 605, such as a light sensor, a motion sensor, and other sensors. Specifically, the light sensor may include an ambient light sensor and a proximity sensor, and the ambient light sensor may adjust the brightness of the display panel 6041 according to ambient lights, and the proximity sensor may turn off the display panel 6041 and/or backlight when the mobile phone reaches nearby the ear. As a kind of motion sensor, the accelerometer sensor can detect the magnitude of acceleration in all directions (typically three axes) and when the mobile phone is stationary, the accelerometer sensor can detect the magnitude and direction of gravity; the accelerometer sensor can be used for mobile-phone gestures-recognition related applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, and unnecessary details will not be repeated herein.

The audio circuit 606, a speaker 6061, a microphone 6062 may provide an audio interface between the user and the mobile phone. The audio circuit 606 may convert the received audio data into electrical signals and transfer the electrical signals to the speaker 6061; thereafter the speaker 6061 converts the electrical signals into sound signals to output. On the other hand, the microphone 6062 converts the received sound signals into electrical signals, which will be received and converted into audio data by the audio circuit 606 to output. The audio data is then processed and transmitted by the processor 608 via the RF circuit 601 to another mobile phone for example, or, the audio data is output to the memory 602 for further processing.

Wi-Fi belongs to a short-range wireless transmission technology. With aid of the Wi-Fi module 607, the mobile phone may assist the user in E-mail receiving and sending, webpage browsing, access to streaming media and the like. Wi-Fi provides users with wireless broadband Internet access. Although the Wi-Fi module 607 is illustrated in FIG. 6, it is to be understood that the Wi-Fi module 607 is not essential to the mobile phone and can be omitted according to actual needs without departing from the essential nature of the present disclosure.

The processor 608 is the control center of the mobile phone, it connects various parts of the whole mobile phone through various interfaces and lines, runs or executes software programs and/or modules stored in the memory 602, and invokes data stored in the memory 602 to perform various functions of the mobile phone and process data, thereby monitoring the mobile phone as a whole. Optionally, the processor 608 may include one or more processing units; for example, the processor 608 may integrate an application processor and a modem processor, where the application processor handles the operating system, user interfaces, applications, and so on, and the modem processor mainly processes wireless communication. It can be understood that the above-mentioned modem processor may not be integrated into the processor 608.

The mobile phone may also include the power supply 609 (e.g., a battery) that supplies power to various components. Preferably, the power supply may be logically connected to the processor 608 via a power management system to enable management of charging, discharging, and power consumption through the power management system.

Although not illustrated, the mobile phone may further include a camera, a Bluetooth module, and so on, and unnecessary details will not be repeated herein.

In the above implementations, method processes in various steps may be realized based on the structure of the mobile phone. The application layer and the kernel of the operating system may both be recognized as a part of an abstract structure of the processor 608.

It shall be noted that in the implementations of the communication device in an operating system, the included units are just divided according to logic functions, and the present disclosure is not limited thereto, what is needed is that the above functions can be realized. In addition, names of various functional units are just used for differentiating different units, and cannot be construed to limit the protection scope of the present disclosure.

It will be understood by those ordinarily skilled in the art that all or a part of steps of the various methods of the implementations described above may be accomplished by means of a program to instruct associated hardware, the program may be stored in a computer-readable storage medium. The storage medium may be a read-only memory (ROM), a disk, a compact disc (CD), or other.

What is claimed is:

1. A method for communication in an operating system, comprising:
   obtaining, by an application layer of a terminal device, a feature sequence via applying a hash algorithm to a character string;
   transmitting, by the application layer of the terminal device, the feature sequence to a kernel of an operating system of the terminal device; and
   determining, by the kernel of the operating system of the terminal device, an operation specified by the character string according to at least the feature sequence and a correspondence relationship between feature sequences and operations specified by character strings.

2. The method of claim 1, wherein obtaining, by the application layer of the terminal device, the feature sequence via applying the hash algorithm to the character string comprises:
   obtaining, by the application layer of the terminal device, a first hash sequence via applying the hash algorithm to the character string; and
   obtaining, by the application layer of the terminal device, a second hash sequence via applying the hash algorithm to the first hash sequence, and setting, by the application layer of the terminal device, the second hash sequence to be the feature sequence.

3. The method of claim 2, wherein the correspondence relationship is recorded in a configuration table, and the configuration table is a configuration table established with feature sequences transmitted to the kernel of the operating system of the terminal device as indexes.

4. The method of claim 3, wherein determining, by the kernel of the operating system of the terminal device, the operation specified by the character string according to at least the feature sequence and the correspondence relationship between the feature sequences and the operations specified by the character strings comprises:
   determining, by the kernel of the operating system of the terminal device, whether the feature sequence corresponds to more than one operation by traversing the configuration table according to the feature sequence;
   requesting from the application layer of the terminal device, by the kernel of the operating system of the terminal device, the first hash sequence based on a determination that the feature sequence corresponds to more than one operation;
   receiving from the application layer of the terminal device, by the kernel of the operating system of the terminal device, the first hash sequence; and
   determining, by the kernel of the operating system of the terminal device, the operation specified by the character string according to the first hash sequence and a one-to-one relationship between hash sequences and operations specified by character strings.

5. The method of claim 4, further comprising:
   determining from the configuration table, by the kernel of the operating system of the terminal device, the operation specified by the character string based on a determination that the feature sequence corresponds to one operation.

6. The method of claim 2, wherein:
   obtaining, by the application layer of the terminal device, the first hash sequence via applying the hash algorithm to the character string comprises:

obtaining, by the application layer of the terminal device, the first hash sequence of a 64-bit length via applying the hash algorithm to the character string; and obtaining, by the application layer of the terminal device, the second hash sequence via applying the hash algorithm to the first hash sequence comprises:

obtaining, by the application layer of the terminal device, the second hash sequence of a 10-bit length or an 11-bit length via applying the hash algorithm to the first hash sequence.

7. The method of claim 1, wherein transmitting, by the application layer of the terminal device, the feature sequence to a kernel of an operating system of the terminal device comprises:

transmitting, by the application layer of the terminal device, the feature sequence to the kernel of the operating system of the terminal device in plaintext form.

8. A terminal device, comprising:

at least one processor; and a computer readable memory, coupled to the at least one processor and storing at least one computer executable instruction therein which, when executed by the at least one processor, causes the at least one processor to:

enable an application layer of the terminal device to obtain a feature sequence via applying a hash algorithm to a character string;

enable the application layer of the terminal device to transmit the feature sequence to a kernel of an operating system of the terminal device; and enable the kernel of the operating system of the terminal device to determine an operation specified by the character string according to at least the feature sequence and a correspondence relationship between feature sequences and operations specified by character strings.

9. The terminal device of claim 8, whether the at least one processor caused to enable the application layer of the terminal device to obtain the feature sequence via applying the hash algorithm to the character string is further caused to:

enable the application layer of the terminal device to obtain a first hash sequence via applying the hash algorithm to the character string; and enable the application layer of the terminal device to obtain a second hash sequence via applying the hash algorithm to the first hash sequence, and enabling the application layer of the terminal device to set the second hash sequence to be the feature sequence.

10. The terminal device of claim 9, wherein the correspondence relationship is recorded in a configuration table, and the configuration table is a configuration table established with feature sequences transmitted to the kernel of the operating system of the terminal device as indexes.

11. The terminal device of claim 10, wherein the at least one processor caused to enable the kernel of the operating system of the terminal device to determine the operation specified by the character string according to at least the feature sequence and the correspondence relationship between the feature sequences and the operations specified by the character strings is further caused to:

enable the kernel of the operating system of the terminal device to determine whether the feature sequence corresponds to more than one operation by traversing the configuration table according to the feature sequence;

enable the kernel of the operating system of the terminal device to request from the application layer of the terminal device the first hash sequence based on a determination that the feature sequence corresponds to more than one operation;

enable the kernel of the operating system of the terminal device to receive from the application layer of the terminal device the first hash sequence; and enable the kernel of the operating system of the terminal device to determine the operation specified by the character string according to the first hash sequence and a one-to-one relationship between hash sequences and operations specified by character strings.

12. The terminal device of claim 11, wherein the at least one processor is further caused to:

enable the kernel of the operating system of the terminal device to determine from the configuration table the operation specified by the character string based on a determination that the feature sequence corresponds to one operation.

13. The terminal device of claim 9, wherein the at least one processor caused to enable the application layer of the terminal device to obtain the first hash sequence via applying the hash algorithm to the character string is further caused to:

enable the application layer of the terminal device to obtain the first hash sequence of a 64-bit length via applying the hash algorithm to the character string; and the at least one processor caused to enable the application layer of the terminal device to obtain the second hash sequence via applying the hash algorithm to the first hash sequence is further caused to:

enable the application layer of the terminal device to obtain the second hash sequence of a 10-bit length or an 11-bit length via applying the hash algorithm to the first hash sequence.

14. The terminal device of claim 8, wherein the at least one processor caused to enable the application layer of the terminal device to transmit the feature sequence to the kernel of the operating system of the terminal device is further caused to:

enable the application layer of the terminal device to transmit the feature sequence to the kernel of the operating system of the terminal device in plaintext form.

15. A terminal device, comprising:

at least one processor; and a computer readable memory, coupled to the at least one processor and storing at least one computer executable instruction therein which, when executed by the at least one processor, causes the at least one processor to:

enable an application layer of the terminal device to obtain a first hash sequence via applying a hash algorithm to a character string;

enable the application layer of the terminal device to obtain a second hash sequence via applying the hash algorithm to the first hash sequence and set the second hash sequence to be a feature sequence;

enable the application layer of the terminal device to transmit the feature sequence to a kernel of an operating system of the terminal device;

enable the kernel of the operating system to determine whether the feature sequence corresponds to more than one operation according to the feature sequence and a correspondence relationship between feature sequences and operations specified by character strings; and enable the kernel of the operating system to determine an operation specified by the character string according to the feature sequence and the correspondence relationship between feature sequences and operations specified by character strings, based on a determination that the feature sequence corresponds to one operation.

16. The terminal device of claim 15, wherein the at least one processor is further caused to:
   enable the kernel of the operating system to receive the first hash sequence from the application layer of the terminal device based on a determination that the feature sequence corresponds to more than one operation; and
   enable the kernel of the operating system to determine an operation specified by the character string according to the first hash sequence and a one-to-one relationship between hash sequences and operations specified by character strings.

17. The terminal device of claim 16, wherein the one-to-one relationship is recorded in a list in a buffer of the memory.

18. The terminal device of claim 15, wherein the correspondence relationship is recorded in a configuration table, and the configuration table is a configuration table established with feature sequences transmitted to the kernel of the operating system of the terminal device as indexes.

19. The terminal device of claim 15, wherein the at least one processor caused to enable the application layer of the terminal device to transmit the feature sequence to the kernel of the operating system of the terminal device is further caused to:
   enable the application layer of the terminal device to transmit the feature sequence to the kernel of the operating system of the terminal device in plaintext form.

20. The terminal device of claim 15, wherein the at least one processor caused to enable the application layer of the terminal device to obtain a first hash sequence via applying the hash algorithm to the character string is further caused to:
   obtain the first hash sequence of a 64-bit length via applying the hash algorithm to the character string; and
   the at least one processor caused to enable the application layer of the terminal device to obtain a second hash sequence via applying the hash algorithm to the first hash sequence is further caused to:
   enable the application layer of the terminal device to obtain the second hash sequence of a 10-bit length or an 11-bit length via applying the hash algorithm to the first hash sequence.

* * * * *